US009912055B2

United States Patent
Moon et al.

(10) Patent No.: US 9,912,055 B2
(45) Date of Patent: Mar. 6, 2018

(54) METHOD AND APPARATUS FOR MODIFYING A RECONFIGURATION ALGORITHM FOR AN ANTENNA SYSTEM

(71) Applicant: The Boeing Company, Chicago, IL (US)

(72) Inventors: Hankyu Moon, Oak Park, CA (US); David L. Allen, Thousand Oaks, CA (US); Gavin D. Holland, Oak Park, CA (US)

(73) Assignee: THE BOEING COMPANY, Chicago, IL (US)

( * ) Notice: Subject to any disclaimer, the term of this patent is extended or adjusted under 35 U.S.C. 154(b) by 909 days.

(21) Appl. No.: 14/327,613

(22) Filed: Jul. 10, 2014

(65) Prior Publication Data

US 2016/0013551 A1  Jan. 14, 2016

(51) Int. Cl.
*H01Q 3/00* (2006.01)
*H01Q 3/26* (2006.01)
(Continued)

(52) U.S. Cl.
CPC ............ *H01Q 3/267* (2013.01); *H01Q 3/28* (2013.01); *H01Q 3/40* (2013.01); *H04B 17/17* (2015.01);
(Continued)

(58) Field of Classification Search
CPC . H01Q 3/00; H01Q 3/40; H01Q 3/267; H04B 17/17; H04B 17/3913
(Continued)

(56) References Cited

U.S. PATENT DOCUMENTS 6,140,976 A * 10/2000 Locke ................ H01Q 3/267
                                                        342/173
8,134,494 B1 * 3/2012 Isom .................. G01S 7/4017
                                                        342/170
(Continued)

FOREIGN PATENT DOCUMENTS

EP          2456102 A2      5/2012
WO     WO2004098104 A1     11/2004
(Continued)

OTHER PUBLICATIONS

Allesina et al., "Googling Food Webs: Can an Eigenvector Measure Species' Importance for Coextinctions?" PLoS Computational Biology, vol. 5, Issue 9, e1000494, Sep. 2009, 6 pages.
(Continued)

*Primary Examiner* — Harry K Liu
(74) *Attorney, Agent, or Firm* — Yee & Associates, P.C.

(57) ABSTRACT

A method and apparatus for improving a performance of an antenna system. An influence network is generated for an array of elements in the antenna system using a reconfiguration algorithm. The influence network indicates an influence of an undesired event occurring at any element in the array of elements on a remaining portion of the array of elements given a current state of the array of elements. A relative ranking of vulnerability is created for elements in the array of elements based on the influence network. The reconfiguration algorithm is modified to take into account the relative ranking of vulnerability to form a modified reconfiguration algorithm. The antenna system using the modified reconfiguration algorithm to compensate for undesired events improves the performance of the antenna system.

20 Claims, 10 Drawing Sheets

(51) Int. Cl.
    *H04B 17/17* (2015.01)
    *H04B 17/391* (2015.01)
    *H01Q 3/28* (2006.01)
    *H01Q 3/40* (2006.01)
    *H04B 17/15* (2015.01)
    *H04B 17/29* (2015.01)

(52) U.S. Cl.
    CPC ......... *H04B 17/3913* (2015.01); *H04B 17/15* (2015.01); *H04B 17/29* (2015.01)

(58) Field of Classification Search
    USPC .......................................................... 342/373
    See application file for complete search history.

(56) References Cited

U.S. PATENT DOCUMENTS

| | | | | |
|---|---|---|---|---|
| 8,619,894 | B1* | 12/2013 | Thomas | H01Q 1/246 375/261 |
| 2003/0162567 | A1* | 8/2003 | Raghothaman | H01Q 3/2605 455/562.1 |
| 2012/0014367 | A1* | 1/2012 | Caillerie | H04B 7/0639 370/345 |

FOREIGN PATENT DOCUMENTS

| | | |
|---|---|---|
| WO | WO2009102486 A2 | 8/2009 |
| WO | WO2014045096 A1 | 3/2014 |

OTHER PUBLICATIONS

Ares et al., "Application of genetic algorithms and simulated annealing technique in optimising the aperture distributions of antenna array patterns," Electronic Letter, vol. 32, No. 3, Feb. 1996, pp. 148-149.

Boeringer et al., "Particle Swarm Optimization Versus Genetic Algorithms for Phased Array Synthesis," IEEE Transactions on Antennas and Propagation, vol. 52, No. 3, Mar. 2004, pp. 771-779.

Boeringer et al., "Efficiency-Constrained Particle Swarm Optimization of a Modified Bernstein Polynominal for Conformal Array Excitation Amplitude Synthesis," IEEE Transactions on Antennas and Propagation, vol. 53, No. 8, Aug. 2005, pp. 2662-2673.

Eberhart et al., "Particle Swarm Optimization: Developments, Applications and Resources," IEEE Congress on Evolutionary Computation, vol. 1, May 2001, pp. 81-86.

Khodier et al., "Linear and Circular Array Optimization: A Study Using Particle Swarm Intelligence," Progress in Electromagnetics Research B, vol. 15, copyright 2009, pp. 347-373.

Keizer et al., "Fast and Accurate Array Calibration Using a Synthetic Array Approach," IEEE Transactions on Antennas and Propagation, vol. 59, No. 11, Nov. 2011, pp. 4115-4122.

Mangoud et al., "Antenna Array Pattern Synthesis and Wide Null Control Using Enhanced Particle Swarm Optimization," Progress in Electromagnetics Research B, vol. 17, copyright 2009, pp. 1-14.

Noordin et al., "Uniform Circular Arrays for Phased Array Antenna," Loughborough Antennas & Propagation Conference, Nov. 2011, pp. 1-4.

Page et al., "The PageRank Citation Ranking: Bringing Order to the Web," International World Wide Web Conference, copyright 1998, 17 pages.

Peters, "A Conjugate Gradient-Based Algorithm to Minimize the Sidelobe Level of Planar Arrays with Element Failures," IEEE Transactions on Antennas and Propagation, vol. 39, No. 10, Oct. 1991, pp. 1497-1504.

Yeo et al., "Array Failure Correction with a Genetic Algorithm," IEEE Transactions on Antennas and Propagation, vol. 47, No. 5, May 1999, pp. 823-828.

Extended European Search Report, dated Dec. 4, 2015, regarding Application No. EP15176209.3, 5 pages.

* cited by examiner

METHOD AND APPARATUS FOR MODIFYING A RECONFIGURATION ALGORITHM FOR AN ANTENNA SYSTEM

BACKGROUND INFORMATION

1. Field

The present disclosure relates generally to systems that have interconnected elements and, in particular, to systems that have reconfigurable interconnected elements. Still more particularly, the present disclosure relates to a method and apparatus for improving a performance of an antenna array by modifying a reconfiguration algorithm to take into account an influence of an undesired event occurring at any of the elements of the antenna array on the remaining portion of the antenna array.

2. Background

Antenna arrays are used in a variety of applications. These applications may include, but are not limited to, communications, radar, acoustic, astronomy, biomedical, and other types of applications. An antenna array is a set of individual antenna elements that are used to transmit electromagnetic radiation, receive electromagnetic radiation, or both.

The antenna elements in an antenna array may be connected together in a fixed arrangement such that the antenna elements function as a single antenna. Each of the antenna elements may be configured such that the current associated with the antenna element has a selected phase and selected amplitude. In this manner, the antenna elements may have a specified phase and amplitude relationship with respect to each other. This type of antenna array may be referred to as a phased array. With a phased array, the phase and amplitude relationship determines the direction in which the effective radiation pattern of the antenna array is reinforced. In some cases, the phase and amplitude relationship of the antenna elements may be changed to electronically steer the antenna array.

Some antenna arrays are reconfigurable. For example, the amplitudes and phases of the different antenna elements in an antenna array may be adjusted to compensate for an undesired event occurring at one or more of the antenna elements. Examples of different reconfiguration algorithms that may be used to make these adjustments include, but are not limited to, a classical gradient search algorithm, a genetic algorithm, particle swarm optimization, a heuristic optimization algorithm, and other types of reconfiguration algorithms.

However, some of these currently available reconfiguration algorithms do not take into account the effects of reconfiguring an antenna array on the overall performance of the antenna array over time. For example, these reconfiguration algorithms may not take into account the impact of reconfiguring an antenna array on the long-term health of the antenna array. Therefore, it would be desirable to have a method and apparatus that take into account at least some of the issues discussed above, as well as other possible issues.

SUMMARY

In one illustrative embodiment, a method for improving a performance of a system is provided. An influence network is generated for an array of elements in the system using a reconfiguration algorithm. The influence network indicates an influence of an undesired event occurring at any element in the array of elements on a remaining portion of the array of elements given a current state of the array of elements. A relative ranking of vulnerability is created for elements in the array of elements based on the influence network. The reconfiguration algorithm is modified to take into account the relative ranking of vulnerability to form a modified reconfiguration algorithm. The system using the modified reconfiguration algorithm to compensate for undesired events improves the performance of the system.

In another illustrative embodiment, an apparatus comprises an analyzer, a ranking generator, and an algorithm modifier. The analyzer is configured to generate an influence network for an array of elements in a system using a reconfiguration algorithm. The influence network indicates an influence of an undesired event occurring at any element in the array of elements on a remaining portion of the array of elements given a current state of the array of elements. The ranking generator is configured to create a relative ranking of vulnerability for elements in the array of elements based on the influence network. The algorithm modifier is configured to modify the reconfiguration algorithm to take into account the relative ranking of vulnerability to form a modified reconfiguration algorithm.

In yet another illustrative embodiment, an antenna management system comprises an antenna system, an analyzer, a ranking generator, and an algorithm modifier. The antenna system comprises an array of antenna elements having a current state. The analyzer is configured to generate an influence network for the array of antenna elements having the current state using a reconfiguration algorithm. The influence network indicates an influence of an undesired event occurring at any antenna element in the array of antenna elements on a remaining portion of the array of antenna elements given the current state of the array of antenna elements. The ranking generator is configured to create a relative ranking of vulnerability for antenna elements in the array of antenna elements based on the influence network. The algorithm modifier is configured to adjust the reconfiguration algorithm to take into account the relative ranking of vulnerability to form a modified reconfiguration algorithm. The antenna system using the modified reconfiguration algorithm to compensate for undesired events improves a performance of the antenna system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to improve the longevity of the antenna elements in an antenna array. In particular, the illustrative embodiments recognize that it may be desirable to have a reconfiguration algorithm for an antenna array that takes into account the impact of reconfiguring the antenna array on the performance of the antenna array over time.

The illustrative embodiments recognize and take into account that adjusting the cost function of the reconfiguration algorithm to take into account the influence of an undesired event occurring at any of the antenna elements in the antenna array on the other antenna elements may result in a reconfiguration of the antenna array that reduces adverse effects on the long-term health of the antenna array. Thus, the illustrative embodiments provide a method, apparatus, and system for improving the performance of a system, such as an antenna system.

In one illustrative embodiment, a method for improving a performance of a system is provided. An influence network is generated for an array of elements in the system using a reconfiguration algorithm. The influence network indicates an influence of an undesired event occurring at any element in the array of elements on a remaining portion of the array of elements given a current state of the array of elements. A relative ranking of vulnerability is created for elements in the array of elements based on the influence network. The reconfiguration algorithm is modified to take into account the relative ranking of vulnerability to form a modified reconfiguration algorithm. The system using the modified reconfiguration algorithm to compensate for undesired events improves the performance of the system.

Figure 1:
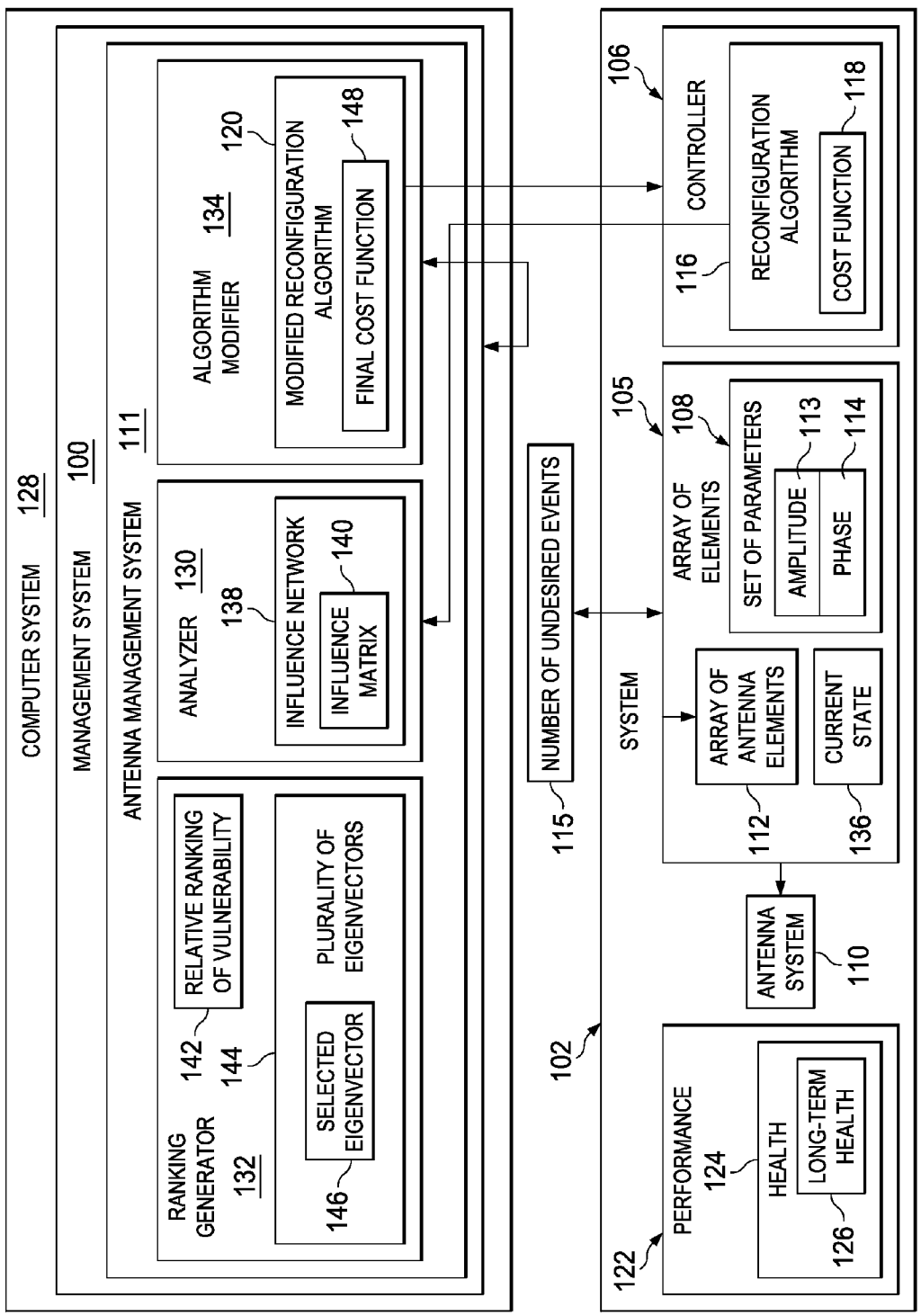
FIG. 1 is an illustration of a management system in the form of a block diagram in accordance with an illustrative embodiment.

Referring now to the figures and, in particular, with reference to FIG. 1, an illustration of a management system is depicted in the form of a block diagram in accordance with an illustrative embodiment. In this illustrative example, management system 100 may be used to manage system 102.

System 102 may comprise array of elements 105 and controller 106. In this illustrative example, array of elements 105 may be a set of individual elements that are associated with each other. As used herein, when one component is "associated" with another component, the association is a physical association in the depicted examples.

For example, a first component, such as one of array of elements 105, may be considered to be associated with a second component, such as another one of array of elements 105, by being at least one of secured to the second component, bonded to the second component, mounted to the second component, welded to the second component, fastened to the second component, or connected to the second component in some other suitable manner. The first component also may be connected to the second component using a third component. Further, the first component may be considered to be associated with the second component by being formed as part of the second component, an extension of the second component, or both.

In one illustrative example, the individual elements in array of elements 105 may be associated with each other in a fixed arrangement. For example, the elements in array of elements 105 may be arranged as an n-dimensional array of elements. For example, array of elements 105 may be a one-dimensional array, a two-dimensional array, a three-dimensional array, or some other n-dimensional array of elements. In one illustrative example, array of elements 105 includes at least three elements.

Each of array of elements 105 may have set of parameters 108 that is adjustable. In particular, each parameter in set of parameters 108 for an element in array of elements 105 may be adjustable within some selected range.

In one illustrative example, system 102 takes the form of antenna system 110. Antenna system 110 may include array of antenna elements 112. In other words, when system 102 takes the form of antenna system 110, array of elements 105 takes the form of array of antenna elements 112. In this illustrative example, set of parameters 108 for each of array of antenna elements 112 may include at least amplitude 113 and phase 114.

Depending on the implementation, antenna system 110 may also be referred to as an antenna array, a phased array, a phased array antenna, or a phased array antenna system. Further, when system 102 takes the form of antenna system 110, management system 100 may be referred to as antenna management system 111.

Controller 106 is configured to control set of parameters 108 for each of array of elements 105 in system 102. Controller 106 may be implemented using hardware, firmware, software, or some combination thereof. In some illustrative examples, controller 106 may be implemented using at least one of a microchip, a processor unit, a microprocessor, an integrated circuit, a computer, or some other type of hardware device.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

When system 102 takes the form of antenna system 110, controller 106 may control amplitude 113 and phase 114 for each of array of antenna elements 112 to electronically steer antenna system 110. Electronically steering antenna system 110 means controlling the direction in which the effective radiation pattern of antenna system 110 is reinforced.

In some situations, an undesired event may occur at any of array of elements 105. For example, number of undesired events 115 may occur in array of elements 105. As used herein, a "number of" items may include one or more items. In this manner, number of undesired events 115 may include one or more events.

In one illustrative example, an undesired event that occurs at an element in array of elements 105 may be the element not performing as desired. For example, the undesired event may be the element not operating within selected tolerances. In some cases, this may be referred to as the element "failing." In response to number of undesired events 115 occurring, controller 106 may use reconfiguration algorithm 116 to adjust set of parameters 108 for each of at least a portion of array of elements 105. This portion may include one, two, three, five, six, ten, twenty, or some other number of elements in array of elements 105.

Adjusting set of parameters 108 for at least one element in array of elements 105 may be referred to as reconfiguring array of elements 105. The values selected for each of set of parameters 108 for each of array of elements 105 at a particular point in time may establish a configuration for array of elements 105 at that time.

In this manner, controller 106 may use reconfiguration algorithm 116 to change the configuration for array of elements 105 in response to number of undesired events 115 occurring. Controller 106 may change the configuration of array of elements 105 to ensure that system 102 may continue to meet a set of performance requirements or resume meeting the set of performance requirements after the occurrence of number of undesired events 115.

Reconfiguration algorithm 116 may include cost function 118. Cost function 118 may quantify the "cost" associated with changing the configuration of array of elements 105. Reconfiguration algorithm 116 may seek to reduce cost function 118 to within selected tolerances. In particular, reconfiguration algorithm 116 may determine the adjustments to the configuration of array of elements 105 that reduce cost function 118 to within selected tolerances. In some cases, reconfiguration algorithm 116 may seek to minimize cost function 118.

Management system 100 may modify reconfiguration algorithm 116 to form modified reconfiguration algorithm 120 for use by controller 106. Using modified reconfiguration algorithm 120 may improve performance 122 of system 102. Performance 122 of system 102 may be measured in a number of different ways.

In one illustrative example, performance 122 of system 102 may be measured based on health 124 of system 102. Health 124 of system 102 may depend on the capability of each of array of elements 105 to continue to operate in a desired manner. For example, health 124 of antenna system 110 may depend on the capability of each of array of antenna elements 112 to continue to operate in a desired manner such that array of antenna elements 112 may be electronically steered with a desired level of accuracy.

In this illustrative example, using modified reconfiguration algorithm 120 may improve health 124 of system 102 by improving long-term health 126 of system 102. Long-term health 126 may be the health of system 102 over time after the configuration of array of elements 105 has been changed. Long-term health 126 may be measured in a number of different ways. Long-term health 126 may be measured by determining at least one of the longevity, reliability, dependability, survivability, or some other factor of each of array of elements 105. In some cases, the longevity, reliability, dependability, and survivability of array of elements 105 as a whole may be considered. Long-term health 126 of system 102 may also be referred to as the future health of system 102.

Management system 100 may be implemented using hardware, firmware, software, or some combination thereof. In one illustrative example, management system 100 may be implemented using computer system 128. Computer system 128 may include one or more computers in communication with each other.

As depicted, management system 100 may include analyzer 130, ranking generator 132, and algorithm modifier 134. Each of analyzer 130, ranking generator 132, and algorithm modifier 134 may be implemented using hardware, firmware, software, or some combination thereof.

Analyzer 130 is configured to generate influence network 138 for array of elements 105 using reconfiguration algorithm 116. Influence network 138 indicates the influence of an undesired event occurring at any element in array of elements 105 on a remaining portion of array of elements 105 given current state 136 of array of elements 105. Current state 136 may include the status of each of array of elements 105. The status of an element in array of elements 105 may be with respect to, for example, without limitation, whether or not the element is operating within selected tolerances.

In one illustrative example, analyzer 130 generates influence network 138 using influence matrix 140. Influence matrix 140 may be comprised of a plurality of rows equal in number to the elements in array of elements 105 and a plurality of columns equal in number to the elements in array of elements 105. For example, when array of elements 105 includes 20 elements, influence matrix 140 may take the form of a 20 by 20 matrix.

Analyzer 130 identifies a weight value for every (i,j) matrix element in influence matrix 140, where i is the index of the rows of influence matrix 140 and j is the index of the columns of influence matrix 140 in this illustrative example. Further, both i and j may correspond to the elements in array of elements 105. Analyzer 130 identifies the weight value for every (i,j) matrix element in influence matrix 140 based on the influence of an undesired event occurring at an $i^{th}$ element in array of elements 105 on a $j^{th}$ element in array of elements 105.

For example, analyzer 130 may use a hypothetical scenario in which an undesired event occurs at the $i^{th}$ element in array of elements 105. Analyzer 130 may use reconfiguration algorithm 116 to generate a new configuration for array of elements 105 to compensate for this undesired event. The influence of this new configuration on the $j^{th}$ element in array of elements 105 may be identified as the weight value for the (i,j) matrix element in influence matrix 140. When system 102 takes the form of antenna system 110, this weight value may be the amplitude selected for the $j^{th}$ element in the new configuration for array of elements 105. In a similar manner, analyzer 130 may identify the weight value for every (i,j) matrix element in influence matrix 140.

In some illustrative examples, this process may be repeated a number of times such that a plurality of weight values are identified for every (i,j) matrix element in influence matrix 140. The plurality of weight values for every (i,j) matrix element in influence matrix 140 may then be averaged to identify a final weight value for every (i,j) matrix element in influence matrix 140.

Ranking generator 132 uses influence network 138 to create relative ranking of vulnerability 142 for the elements in array of elements 105. In one illustrative example, ranking generator 132 may use an eigenvector-based technique to create relative ranking of vulnerability 142. For example, ranking generator 132 may generate plurality of eigenvectors 144 for influence network 138. Each of plurality of eigenvectors 144 may include a plurality of coordinates equal in number to the elements in array of elements 105.

Next, ranking generator 132 may select the eigenvector in plurality of eigenvectors 144 associated with a largest eigenvalue as selected eigenvector 146. The plurality of coordinates of selected eigenvector 146 may then be ordered, or sorted by value, to create relative ranking of vulnerability 142 for the elements in array of elements 105. Relative ranking of vulnerability 142 identifies the one or more elements in array of elements 105 that will be most vulnerable to future undesired events occurring at those one or more elements based on the new configuration generated for array of elements 105 using reconfiguration algorithm 116.

Algorithm modifier 134 uses relative ranking of vulnerability 142 to modify reconfiguration algorithm 116 to form modified reconfiguration algorithm 120. In particular, algorithm modifier 134 adjusts cost function 118 of reconfiguration algorithm 116 to form final cost function 148 that takes into account relative ranking of vulnerability 142.

In this illustrative example, cost function 118, which is the original cost function for reconfiguration algorithm 116, may only include a performance cost function. The performance cost function may be the cost associated with reconfiguring array of elements 105 with respect to a set of performance requirements. In other words, the performance cost function identifies the impact that reconfiguring array of elements 105 has on array of elements 105 meeting the set of performance requirements. The set of performance requirements may include, for example, without limitation, at least one of a desired average sidelobe level, a maximum sidelobe level, a desired width for the main lobe, some other type of performance requirement, or some combination thereof.

Final cost function 148 adds an influence cost function to the performance cost function. The influence cost function adds the cost to long-term health 126 of system 102 that is associated with reconfiguring array of elements 105. Adjusting reconfiguration algorithm 116 to use final cost function 148 forms modified reconfiguration algorithm 120. Modified reconfiguration algorithm 120 seeks to reduce, and in some cases, minimize, final cost function 148. In other illustrative examples, modified reconfiguration algorithm 120 seeks to ensure that the influence cost function is held below a selected threshold.

Modified reconfiguration algorithm 120 may then be sent to controller 106 for use by system 102 in compensating for undesired events that may occur. The process of modifying a current reconfiguration algorithm being used to form a new reconfiguration algorithm may be performed any number of times over the life cycle of system 102. In this manner, performance 122, and in particular, long-term health 126, of system 102 may be ensured to be taken into account when any compensation for undesired events is performed, given current state 136 of array of elements 105.

The illustration of management system 100 and system 102 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
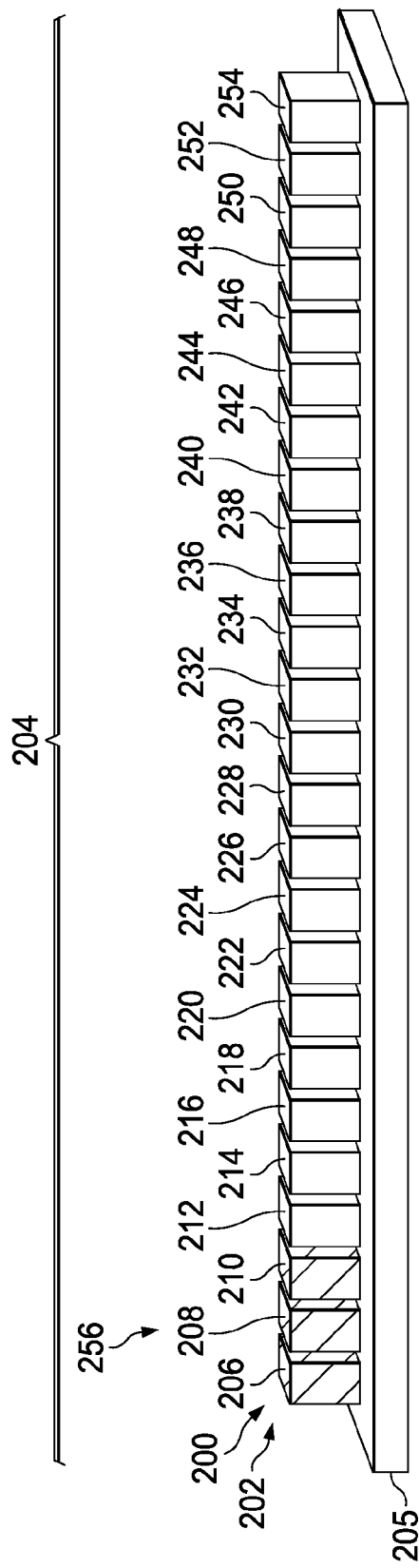
FIG. 2 is an illustration of an antenna system in accordance with an illustrative embodiment.

With reference now to FIG. 2, an illustration of an antenna system is depicted in accordance with an illustrative embodiment. Antenna system 200 may be an example of one implementation for antenna system 110 in FIG. 1. As depicted, antenna system 200 includes array of antenna elements 202, which may be an example of one implementation for array of antenna elements 112 in FIG. 1.

Array of antenna elements 202 includes plurality of antenna elements 204 associated with base structure 205. Plurality of antenna elements 204 includes antenna elements 206, 208, 210, 212, 214, 216, 218, 220, 222, 224, 226, 228, 230, 232, 234, 236, 238, 240, 242, 244, 246, 248, 250, 252, and 254. The amplitude and phase for each of these twenty-five antenna elements may be adjustable.

In this illustrative example, array of antenna elements 202 is in current state 256. In current state 256, antenna element 206, antenna element 208, and antenna element 210 are not operating within selected tolerances. Antenna element 206, antenna element 208, and antenna element 210 may be considered "non-performing antenna elements" because these antenna elements are not performing as desired.

Figure 3:
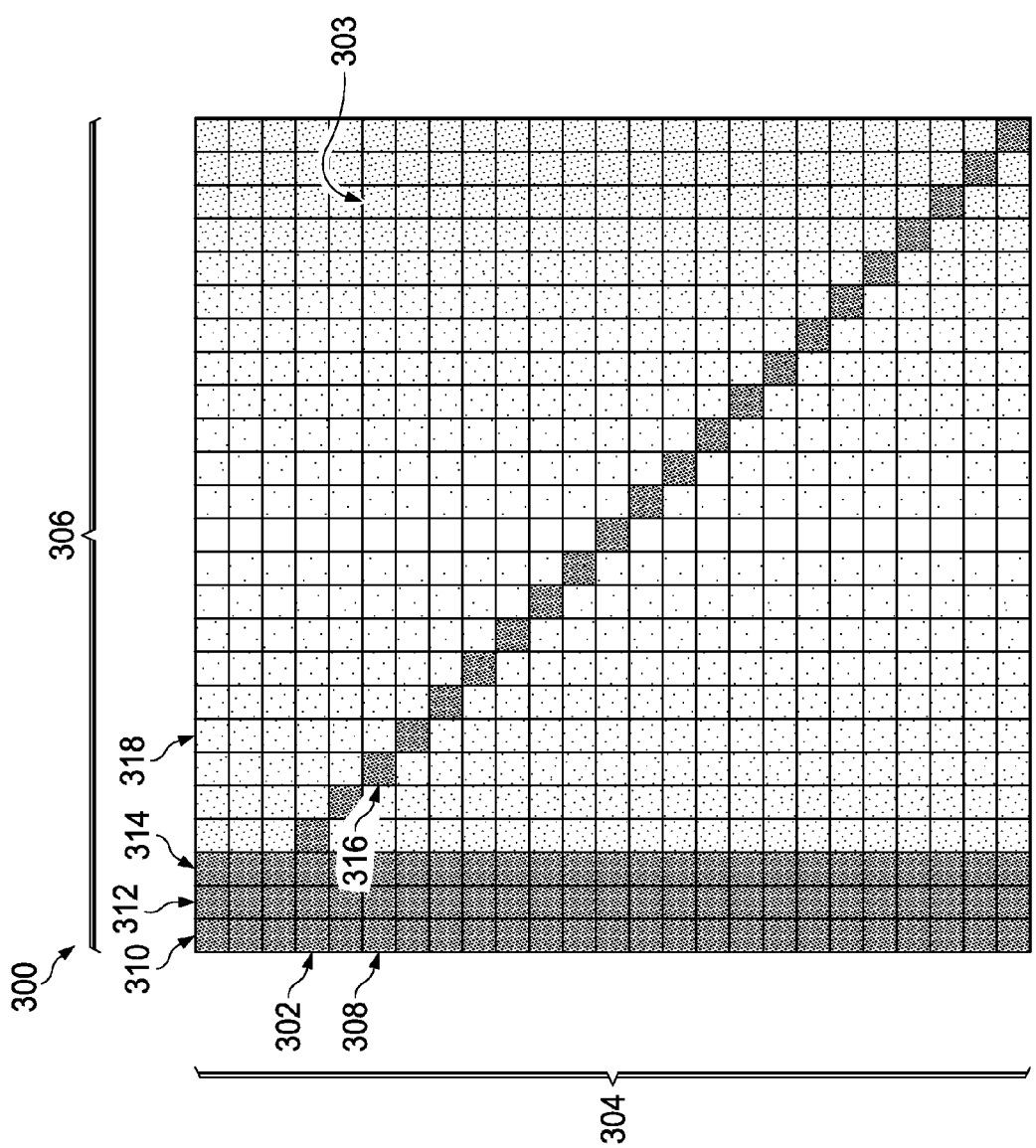
FIG. 3 is an illustration of an influence network in accordance with an illustrative embodiment.

With reference now to FIG. 3, an illustration of an influence network is depicted in accordance with an illustrative embodiment. In this illustrative example, influence network 300 may be an example of one implementation for influence network 138 in FIG. 1.

As depicted, influence network 300 may be implemented in the form of influence matrix 302. Influence matrix 302 is represented using pixels 303 in this illustrative example.

Influence matrix 302 includes plurality of rows 304 and plurality of columns 306. Plurality of rows 304 includes twenty-five rows, thereby matching the number of antenna elements in array of antenna elements 202 in FIG. 2. Similarly, plurality of columns 306 includes twenty-five columns, thereby matching the number of antenna elements in array of antenna elements 202 in FIG. 2.

For each $i^{th}$ row in plurality of rows 304, the influence of an undesired event occurring at the corresponding $i^{th}$ element in array of antenna elements 202 in FIG. 2 on the remaining portion of array of antenna elements 202 is determined with respect to a selected reconfiguration algorithm for array of antenna elements 202. In this illustrative example, the weight value given to each (i,j) element of influence matrix 302 is represented using an intensity for the corresponding pixel.

For example, sixth row 308 corresponds to the sixth antenna element in array of antenna elements 202, which is antenna element 216 in FIG. 2. The hypothetical scenario in which antenna element 216 becomes non-performing is considered given current state 256 of array of antenna elements 202 in FIG. 2. The new amplitude for each of the remaining portion of array of antenna elements 202 under this hypothetical scenario is computed using the selected reconfiguration algorithm.

These new amplitudes are converted into intensity values for the pixels in sixth row 308. A higher intensity value indicates a higher amplitude. A lower intensity value indicates a lower amplitude. In other words, a brighter pixel indicates a higher amplitude and a darker pixel indicates a lower amplitude.

As depicted, first column 310, second column 312, and third column 314 are shown as having the lowest intensity values because these columns correspond to antenna element 206, antenna element 208, and antenna element 210, respectively, in FIG. 2. These antenna elements are already non-performing antenna elements and thus, are not considered reconfigurable. In other words, the new amplitudes of these antenna elements are not considered.

Pixel 316 is the (6,6) matrix element at sixth row 308 and sixth column 318. Pixel 316 also has the lowest intensity value because this matrix element corresponds to antenna element 216 being a non-performing antenna element in the hypothetical scenario.

Figure 4:
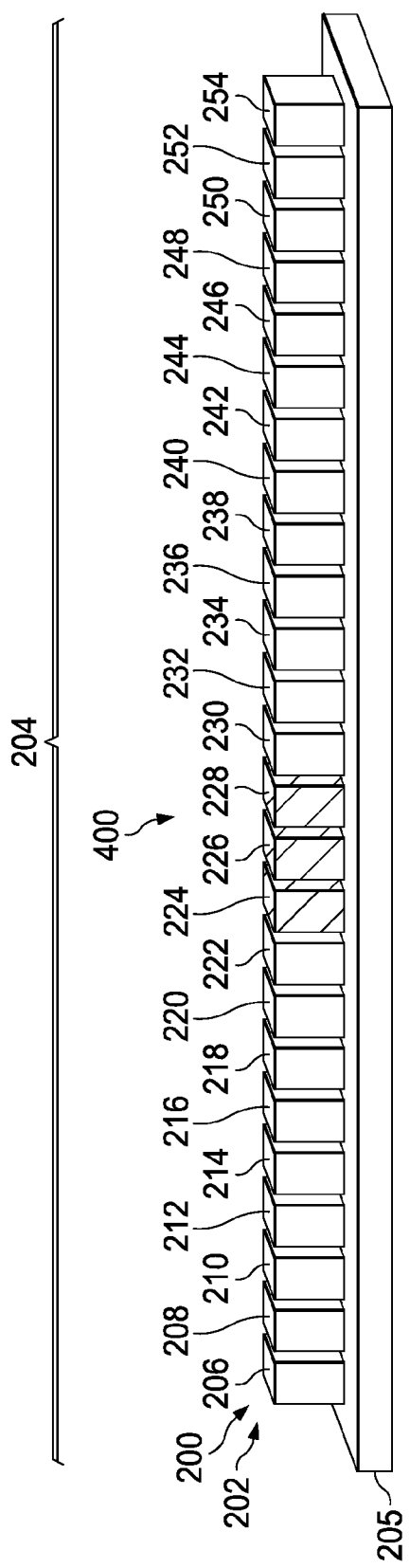
FIG. 4 is an illustration of an antenna system having a different state in accordance with an illustrative embodiment.

With reference now to FIG. 4, an illustration of antenna system 200 from FIG. 2 having a different state is depicted in accordance with an illustrative embodiment. In this illustrative example, array of antenna elements 202 is in current state 400. In current state 400, antenna element 206, antenna element 208, and antenna element 210 are not operating within selected tolerances. Antenna element 224, antenna element 226, and antenna element 228 may be considered "non-performing antenna elements" because these antenna elements are not performing as desired.

Figure 5:
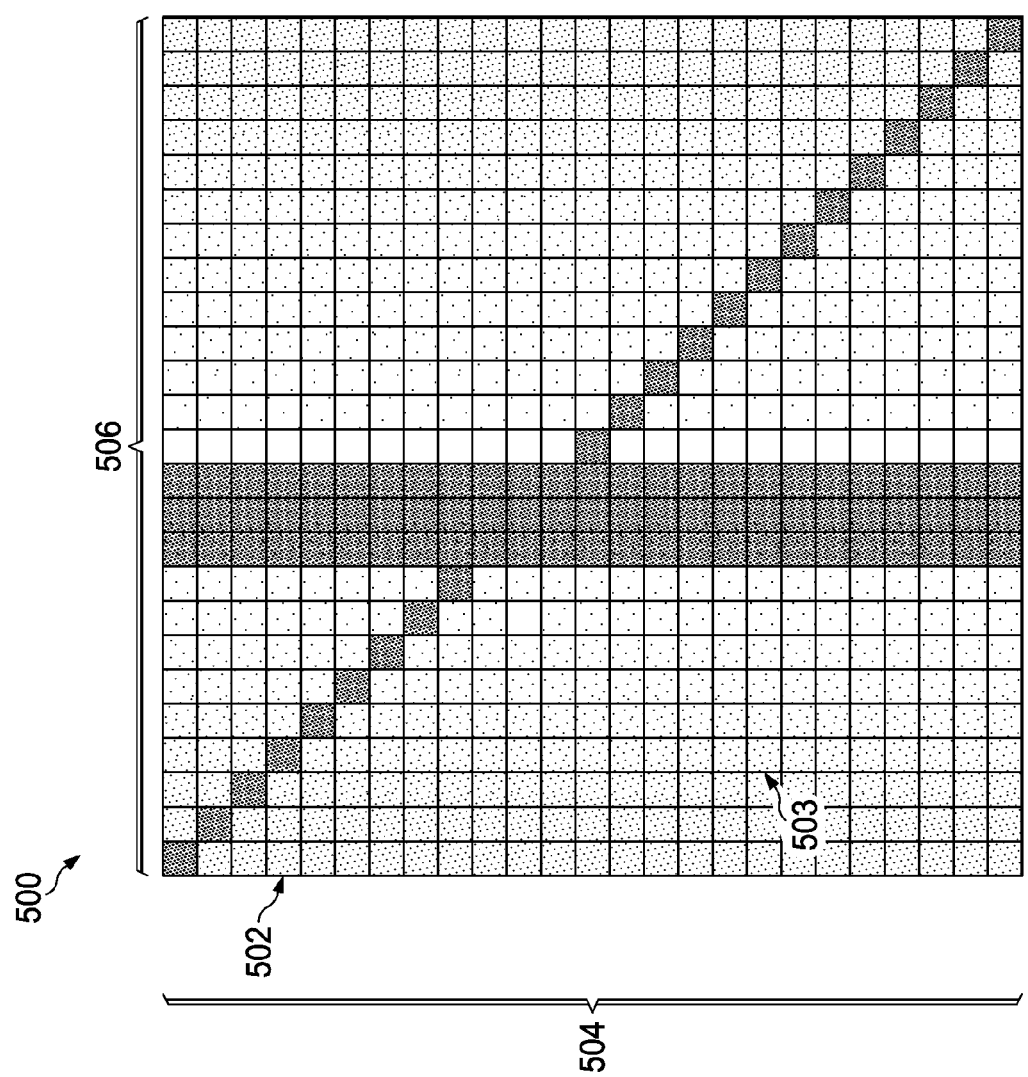
FIG. 5 is an illustration of an influence network in accordance with an illustrative embodiment.

With reference now to FIG. 5, an illustration of an influence network is depicted in accordance with an illustrative embodiment. In this illustrative example, influence network 500 may be an example of one implementation for influence network 138 in FIG. 1. Influence network 500 may be implemented in a manner similar to influence network 300 in FIG. 3.

As depicted, influence network 500 is implemented in the form of influence matrix 502. Influence matrix 502 is represented using pixels 503 in this illustrative example.

Influence matrix 502 includes plurality of rows 504 and plurality of columns 506. Plurality of rows 504 includes twenty-five rows, thereby matching the number of antenna elements in array of antenna elements 202 in FIG. 4. Similarly, plurality of columns 506 includes twenty-five columns, thereby matching the number of antenna elements in array of antenna elements 202 in FIG. 4.

For each $i^{th}$ row in plurality of rows 504, the influence of an undesired event occurring at the corresponding $i^{th}$ element in array of antenna elements 202 in FIG. 4 on the remaining portion of array of antenna elements 202 is determined with respect to a selected reconfiguration algorithm for array of antenna elements 202, given current state 400 of array of antenna elements 202. In this illustrative example, the weight value given to each (i,j) element of influence matrix 502 is represented using an intensity for the corresponding pixel.

The illustrations of antenna system 200 in FIGS. 2 and 4, influence network 300 in FIG. 3, and influence network 500 in FIG. 5 are not meant to imply physical or architectural limitations to the manner in which an illustrative embodiment may be implemented. Other components in addition to or in place of the ones illustrated may be used. Some components may be optional.

Figure 6:
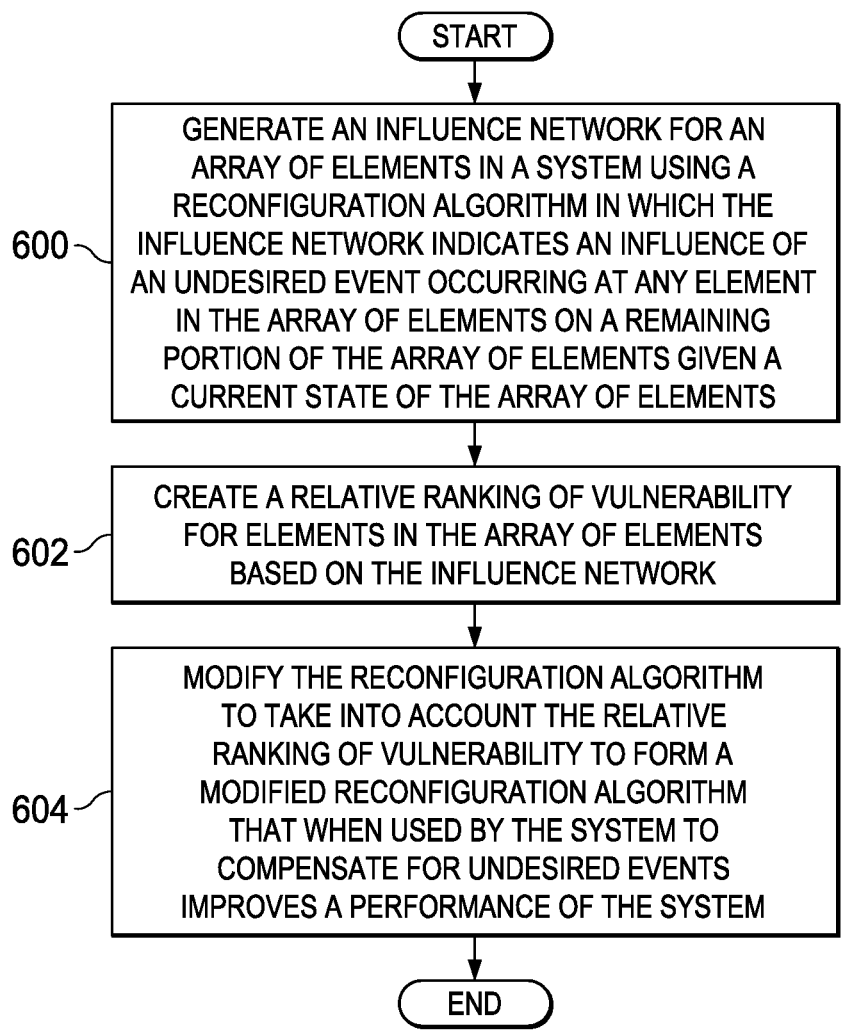
FIG. 6 is an illustration of a process for improving a performance of a system in the form of a flowchart in accordance with an illustrative embodiment.

With reference now to FIG. 6, an illustration of a process for improving a performance of a system is depicted in the form of a flowchart in accordance with an illustrative embodiment. The process illustrated in FIG. 6 may be implemented using, for example, management system 100 in FIG. 1.

The process may begin by generating an influence network for an array of elements in a system using a reconfiguration algorithm in which the influence network indicates an influence of an undesired event occurring at any element in the array of elements on a remaining portion of the array of elements given a current state of the array of elements (operation 600). Thereafter, a relative ranking of vulnerability is created for elements in the array of elements based on the influence network (operation 602).

The reconfiguration algorithm is then modified to take into account the relative ranking of vulnerability to form a modified reconfiguration algorithm that, when used by the system to compensate for undesired events, improves a performance of the system (operation 604), with the process terminating thereafter. In particular, using the modified reconfiguration algorithm in operation 604 to compensate for the undesired events may improve the long-term performance, and in particular, the long-term health, of the system.

Figure 7:
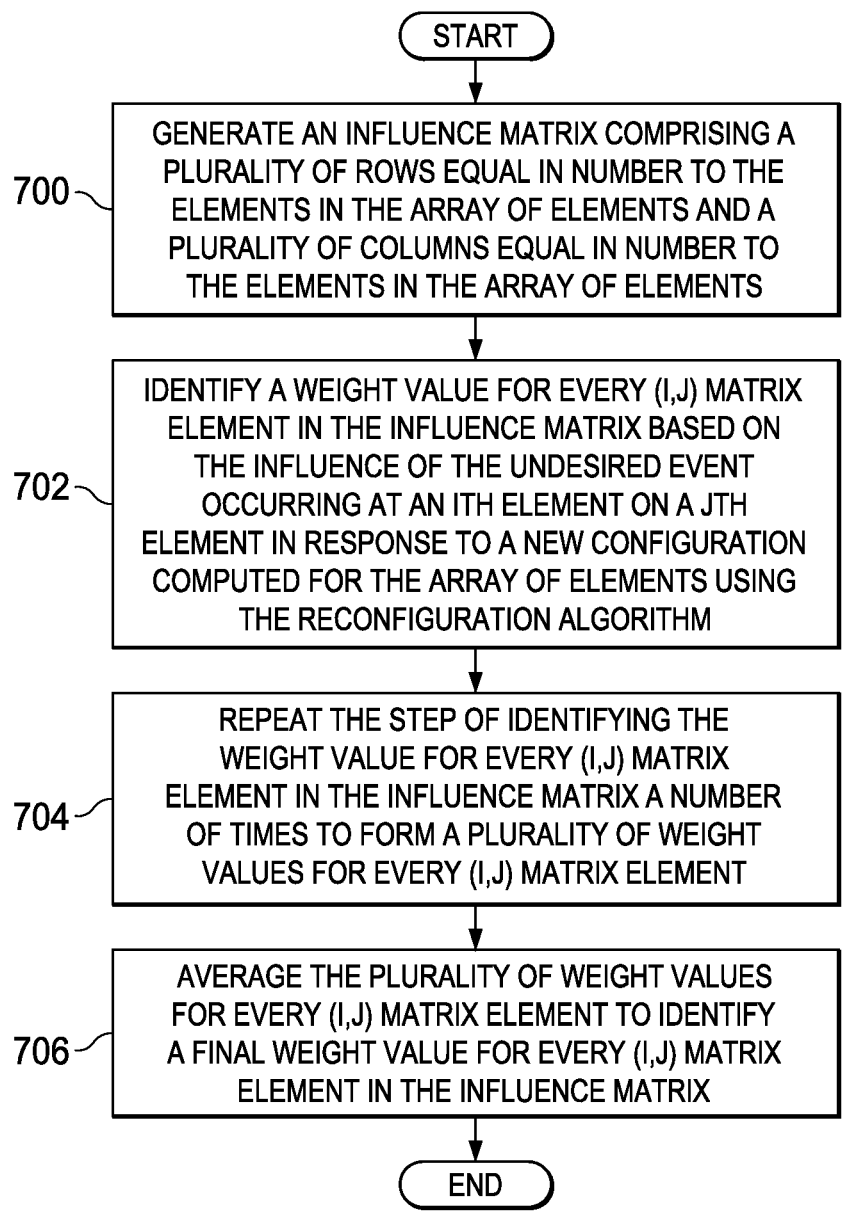
FIG. 7 is an illustration of a process for generating an influence network for an array of elements in the form of a flowchart in accordance with an illustrative embodiment.

With reference now to FIG. 7, an illustration of a process for generating an influence network for an array of elements is depicted in the form of a flowchart in accordance with an illustrative embodiment. The process illustrated in FIG. 7 may be an example of one manner in which operation 600 in FIG. 6 may be implemented. In one illustrative example, the process in FIG. 7 may be implemented using, without limitation, analyzer 130 in FIG. 1.

The process may begin by generating an influence matrix comprising a plurality of rows equal in number to the elements in the array of elements and a plurality of columns equal in number to the elements in the array of elements (operation 700). Next, a weight value is identified for every (i,j) matrix element in the influence matrix based on the influence of the undesired event occurring at an $i^{th}$ element on a $j^{th}$ element in response to a new configuration computed for the array of elements using the reconfiguration algorithm (operation 702).

The step of identifying the weight value for every (i,j) matrix element in the influence matrix is repeated a number of times to form a plurality of weight values for every (i,j) matrix element (operation 704). The plurality of weight values for every (i,j) matrix element are averaged to identify a final weight value for every (i,j) matrix element in the influence matrix (operation 706), with the process terminating thereafter. The influence matrix formed having these final weight values may be the influence network used to create the relative ranking of vulnerability in operation 602 in FIG. 6.

Figure 8:
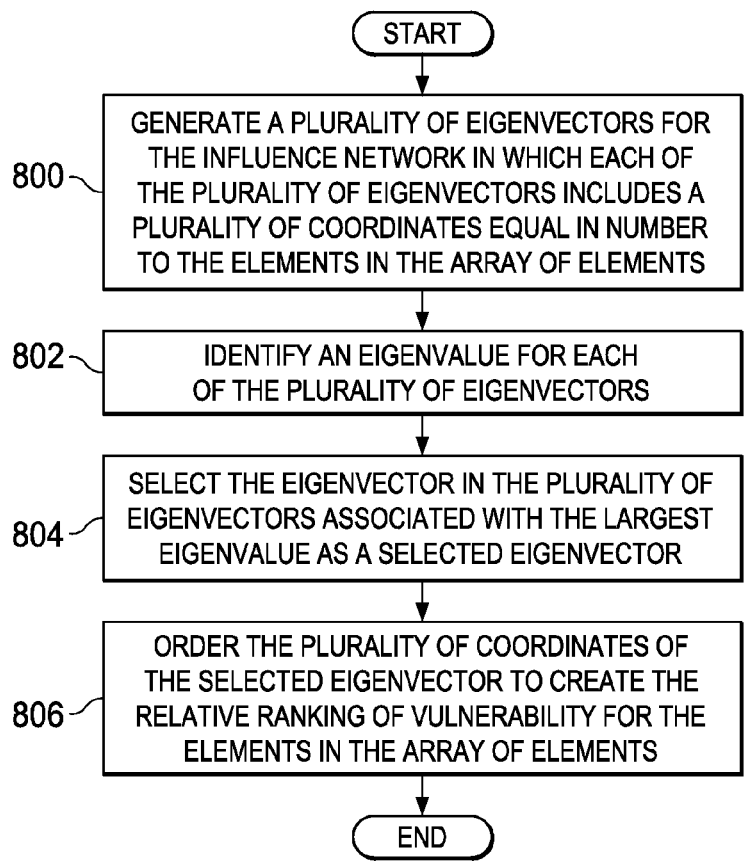
FIG. 8 is an illustration of a process for creating a relative ranking of vulnerability in the form of a flowchart in accordance with an illustrative embodiment.

With reference now to FIG. 8, an illustration of a process for creating a relative ranking of vulnerability is depicted in the form of a flowchart in accordance with an illustrative embodiment. The process illustrated in FIG. 8 may be an example of one manner in which operation 602 in FIG. 6 may be implemented. In one illustrative example, the process in FIG. 8 may be implemented using, without limitation, ranking generator 132 in FIG. 1.

The process may begin by generating a plurality of eigenvectors for the influence network in which each of the plurality of eigenvectors includes a plurality of coordinates equal in number to the elements in the array of elements (operation 800). In operation 800, the plurality of eigenvectors may be generated for the influence network formed using the process described in FIG. 7.

Next, an eigenvalue for each of the plurality of eigenvectors is identified (operation 802). The eigenvector in the plurality of eigenvectors associated with the largest eigenvalue is selected as a selected eigenvector (operation 804). In operation 804, the selected eigenvector may be expressed as follows:

$$V(1)=(V(1,1),\ldots,V(1,N)),\text{ where} \quad (1)$$

$$WV(1)=r(1)V(1) \quad (2)$$

where W is the influence network, V(1) is the selected eigenvector, r(1) is the largest eigenvalue of the eigenvalues identified for the plurality of eigenvectors, and N is the total number of elements in the array of elements. In this illustrative example, V(1,n) is a relative rank of the $n^{th}$ element in the array of elements in terms of vulnerability to not performing as desired. For example, when V(1,n)>V(1,m), the $n^{th}$ element in the array of elements is considered more vulnerable than the $m^{th}$ element in the array of elements.

The plurality of coordinates of the selected eigenvector are ordered to create the relative ranking of vulnerability for the elements in the array of elements (operation 806), with the process terminating thereafter. Operation 806 may be performed such that the most vulnerable elements may be easily identified.

Figure 9:
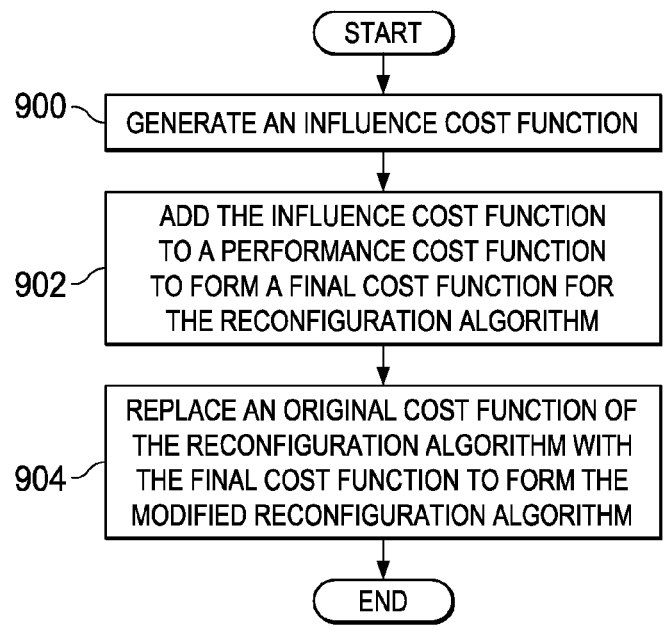
FIG. 9 is an illustration of a process for modifying a reconfiguration algorithm in the form of a flowchart in accordance with an illustrative embodiment.

With reference now to FIG. 9, an illustration of a process for modifying a reconfiguration algorithm is depicted in the form of a flowchart in accordance with an illustrative embodiment. The process illustrated in FIG. 9 may be an example of one manner in which operation 604 in FIG. 6 may be implemented. In one illustrative example, the process in FIG. 9 may be implemented using, without limitation, algorithm modifier 134 in FIG. 1.

The process may begin by generating an influence cost function (operation 900). In operation 900, the influence cost function may be expressed as follows:

$$\text{InfluenceCost}(z(1),z(2),\ldots,z(N)) = V(1,1)z(1) + \ldots + V(1,N)z(N) \quad (3)$$

where InfluenceCost(z(1), z(2), . . . , z(N)) is the influence cost function that identifies the cost of implementing a new configuration and where each of z(1), z(2), . . . , z(N) comprises a new value in the new configuration for at least one of the set of parameters for the corresponding element. When the array of elements is an array of antenna elements, z(1), z(2), . . . , z(N) may be new amplitudes for array of elements. For example, z(n) may be new amplitude for the $n^{th}$ element.

Thereafter, the influence cost function may be added to a performance cost function to form a final cost function for the reconfiguration algorithm (operation 902). The final cost function may be expressed as follows:

$$\text{FinalCost}(z(1),z(2),\ldots,z(N)) = \text{PerformanceCost}(z(1),z(2),\ldots,z(N)) + \text{InfluenceCost}(z(1),z(2),\ldots,z(N)) \quad (4)$$

where FinalCost (z(1), z(2), . . . , z(N)) is the final cost function and PerformanceCost(z(1), z(2), . . . , z(N)) is the performance cost function.

In operation 902, the performance cost function may be the cost function associated with reconfiguring the array of elements to meet a set of performance requirements. For example, the performance cost function may define the cost associated with configuring the array of elements with respect to providing a desired average sidelobe level, a maximum sidelobe level, a desired width for the main lobe, some other type of performance requirement, or some combination thereof.

An original cost function of the reconfiguration algorithm is then replaced with the final cost function to form the modified reconfiguration algorithm (operation 904), with the process terminating thereafter. Using the modified reconfiguration algorithm for the array of elements may ensure that the long-term health of the system is taken into account when computing new values for the parameters of the array of elements. In other words, the modified reconfiguration algorithm may seek to reduce, and in some cases, minimize, both the cost of meeting a set of performance requirements and the cost to the long-term health or performance of the array of elements.

Figure 10:
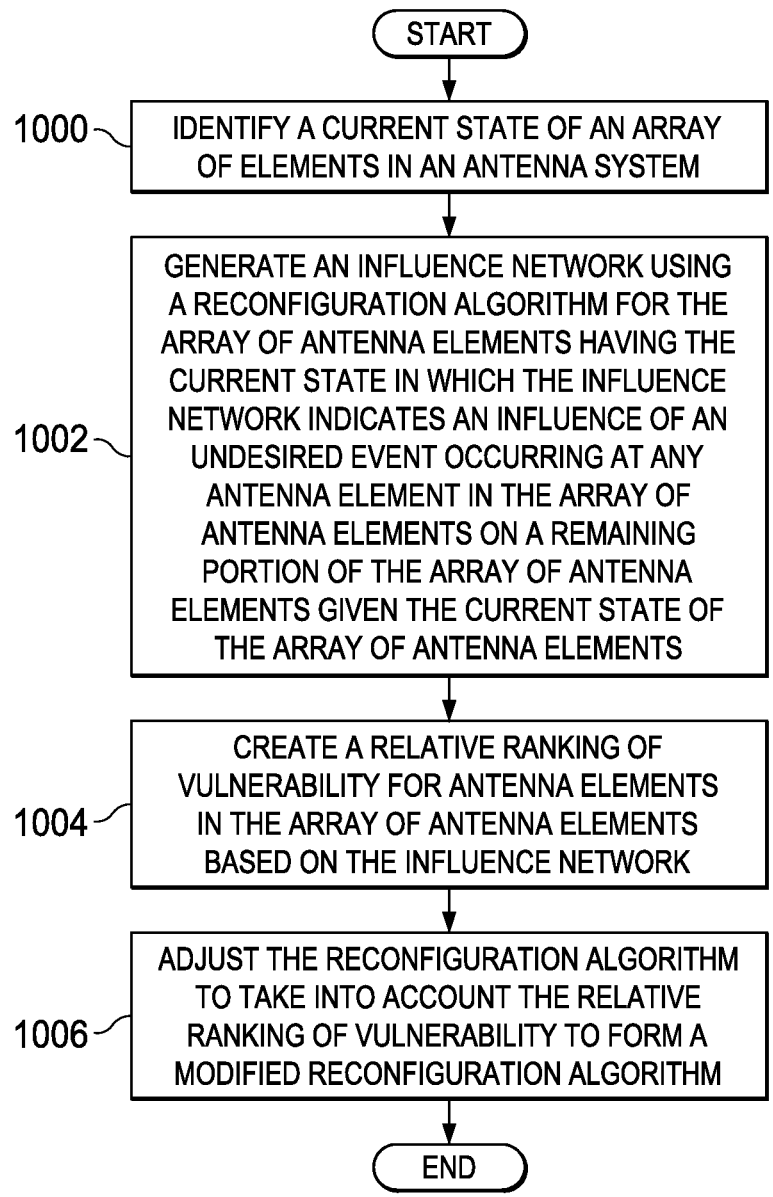
FIG. 10 is an illustration of a process for improving a performance of an antenna system in the form of a flowchart in accordance with an illustrative embodiment.

With reference now to FIG. 10, an illustration of a process for improving a performance of an antenna system is depicted in the form of a flowchart in accordance with an illustrative embodiment. The process illustrated in FIG. 10 may be implemented using, for example, antenna management system 111 in FIG. 1.

The process begins by identifying a current state of an array of elements in an antenna system (operation 1000). Next, an influence network is generated using a reconfiguration algorithm for the array of antenna elements having the current state in which the influence network indicates an influence of an undesired event occurring at any antenna element in the array of antenna elements on a remaining portion of the array of antenna elements given the current state of the array of antenna elements (operation 1002).

Thereafter, a relative ranking of vulnerability is created for antenna elements in the array of antenna elements based on the influence network (operation 1004). Next, the reconfiguration algorithm is adjusted to take into account the relative ranking of vulnerability to form a modified reconfiguration algorithm (operation 1006), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in other cases, operation 902 and operation 904 in FIG. 9 may be replaced with an operation that modifies the reconfiguration algorithm such that the modified reconfiguration algorithm seeks to reduce the original cost function, which comprises solely the performance cost function, such that the influence cost function is reduced below a selected threshold.

Figure 11:
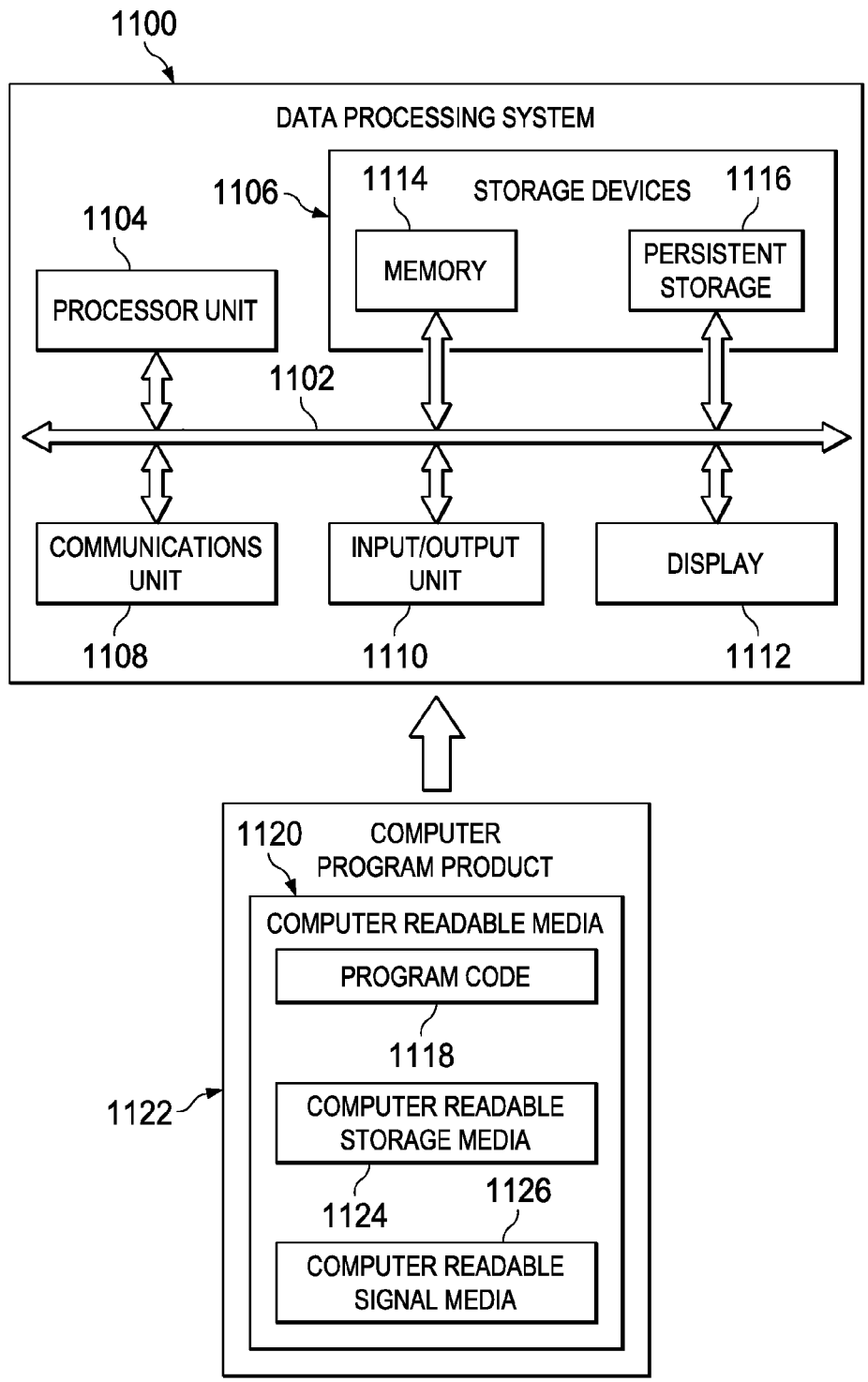
FIG. 11 is an illustration of a data processing system in the form of a block diagram in accordance with an illustrative embodiment.

Turning now to FIG. 11, an illustration of a data processing system is depicted in the form of a block diagram in accordance with an illustrative embodiment. Data processing system 1100 may be used to implement controller 106 or computer system 128 in FIG. 1. As depicted, data processing system 1100 includes communications framework 1102, which provides communications between processor unit 1104, storage devices 1106, communications unit 1108, input/output unit 1110, and display 1112. In some cases, communications framework 1102 may be implemented as a bus system.

Processor unit 1104 is configured to execute instructions for software to perform a number of operations. Processor unit 1104 may comprise at least one of a number of processors, a multi-processor core, or some other type of processor, depending on the implementation. In some cases, processor unit 1104 may take the form of a hardware unit, such as a circuit system, an application specific integrated circuit (ASIC), a programmable logic device, or some other suitable type of hardware unit.

Instructions for the operating system, applications, and programs run by processor unit 1104 may be located in storage devices 1106. Storage devices 1106 may be in communication with processor unit 1104 through communications framework 1102. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 1114 and persistent storage 1116 are examples of storage devices 1106. Memory 1114 may take the form of, for example, a random access memory or some type of volatile or non-volatile storage device. Persistent storage 1116 may comprise any number of components or devices. For example, persistent storage 1116 may comprise a hard drive, a flash memory, a rewritable optical disk, a rewritable magnetic tape, or some combination of the above. The media used by persistent storage 1116 may or may not be removable.

Communications unit 1108 allows data processing system 1100 to communicate with other data processing systems, devices, or both. Communications unit 1108 may provide communications using physical communications links, wireless communications links, or both.

Input/output unit 1110 allows input to be received from and output to be sent to other devices connected to data processing system 1100. For example, input/output unit 1110 may allow user input to be received through a keyboard, a mouse, some other type of input device, or a combination thereof. As another example, input/output unit 1110 may allow output to be sent to a printer connected to data processing system 1100.

Display 1112 is configured to display information to a user. Display 1112 may comprise, for example, without limitation, a monitor, a touch screen, a laser display, a holographic display, a virtual display device, some other type of display device, or a combination thereof.

In this illustrative example, the processes of the different illustrative embodiments may be performed by processor unit 1104 using computer-implemented instructions. These instructions may be referred to as program code, computer usable program code, or computer readable program code and may be read and executed by one or more processors in processor unit 1104.

In these examples, program code 1118 is located in a functional form on computer readable media 1120, which is selectively removable, and may be loaded onto or transferred to data processing system 1100 for execution by processor unit 1104. Program code 1118 and computer readable media 1120 together form computer program product 1122. In this illustrative example, computer readable media 1120 may be computer readable storage media 1124 or computer readable signal media 1126.

Computer readable storage media 1124 is a physical or tangible storage device used to store program code 1118 rather than a medium that propagates or transmits program code 1118. Computer readable storage media 1124 may be, for example, without limitation, an optical or magnetic disk or a persistent storage device that is connected to data processing system 1100.

Alternatively, program code 1118 may be transferred to data processing system 1100 using computer readable signal media 1126. Computer readable signal media 1126 may be, for example, a propagated data signal containing program code 1118. This data signal may be an electromagnetic signal, an optical signal, or some other type of signal that can be transmitted over physical communications links, wireless communications links, or both.

The illustration of data processing system 1100 in FIG. 11 is not meant to provide architectural limitations to the manner in which the illustrative embodiments may be implemented. The different illustrative embodiments may be implemented in a data processing system that includes components in addition to or in place of those illustrated for data processing system 1100. Further, components shown in FIG. 11 may be varied from the illustrative examples shown.

Thus, the illustrative embodiments provide a method and apparatus for improving the overall performance of a system comprised of elements, such as an antenna system comprised of an array of elements. The reconfiguration algorithm used by an antenna system, such as antenna system 110 in FIG. 1, may be modified to take into account the impact that changing the configuration of the array of antenna elements will have on the different antenna elements in the array of antenna elements.

For example, increasing the amplitude of one or more antenna elements around a particular antenna element at which an undesired event has occurred may result in at least one of clustered undesired events occurring around the particular antenna element, a reduced overall performance of the antenna system, a reduced health of the antenna elements having the increased amplitudes, or some combination thereof. Modifying the reconfiguration algorithm to form a modified reconfiguration algorithm, such as modified reconfiguration algorithm 120 in FIG. 1, may help improve the longevity and reliability of the different antenna elements in the array of antenna elements.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for improving a performance of a system, the method comprising:

forming an antenna system comprising an array of elements;

generating, using an analyzer in a computer system, an influence network for the array of elements in the system using a reconfiguration algorithm, the influence network indicating an influence, given a current state of the array of elements, of an undesired event occurring at any element in the array of elements on a remaining portion of the array of elements;

creating, using a ranking generator in the computer system, a relative ranking, based on the influence network, of vulnerability for elements in the array of elements via generating a plurality of eigenvectors for the influence network, each of the plurality of eigenvectors comprising a plurality of coordinates equal in number to the elements in the array of elements; and modifying, using an algorithm modifier in the computer system, the reconfiguration algorithm to take into account the relative ranking of vulnerability to form a modified reconfiguration algorithm, wherein the system using the modified reconfiguration algorithm to compensate for undesired events improves the performance of the system.

2. The method of claim 1, further comprising:
generating an influence matrix comprising a plurality of rows equal in number to a number of the elements in the array of elements and a plurality of columns equal in number to the number of the elements in the array of elements.

3. The method of claim 2, further comprising:
identifying a weight value for every (i,j) matrix element in the influence matrix based on the influence of the undesired event occurring at an $i^{th}$ element on a $j^{th}$ element.

4. The method of claim 3, further comprising:
repeating the step of identifying the weight value for the every (i,j) matrix element in the influence matrix a number of times to form a plurality of weight values for the every (i,j) matrix element; and
averaging the plurality of weight values to identify a final weight value for the every (i,j) matrix element in the influence matrix.

5. The method of claim 1, further comprising:
selecting an eigenvector in the plurality of eigenvectors associated with a largest eigenvalue as a selected eigenvector; and
ordering the plurality of coordinates of the selected eigenvector to create the relative ranking of vulnerability for the elements in the array of elements.

6. The method of claim 5, further comprising:
adjusting a cost function of the reconfiguration algorithm to take into account the relative ranking of vulnerability to form the modified reconfiguration algorithm.

7. The method of claim 6, further comprising:
generating an influence cost function; and
adding the influence cost function to a performance cost function to form a final cost function for the reconfiguration algorithm.

8. The method of claim 7, further comprising:
generating the influence cost function using the plurality of coordinates for the selected eigenvector and an influence matrix.

9. The method of claim 8 further comprising:
calculating a result of the influence cost function by multiplying each of the plurality of coordinates of the selected eigenvector by a corresponding weight value in the influence matrix for a corresponding element in the array of elements to form a plurality of terms; and
summing the plurality of terms to form the result.

10. The method of claim 1 further comprising:
identifying the current state of the array of elements in the system, wherein the system is an antenna system and the array of elements is an array of antenna elements.

11. An apparatus comprising:
an analyzer configured to generate an influence network for an antenna system that comprises an array of elements using a reconfiguration algorithm, wherein the influence network indicates an influence of an undesired event occurring at any element in the array of elements on a remaining portion of the array of elements given a current state of the array of elements;
a ranking generator configured to create, based on the influence network, a relative ranking of vulnerability for elements in the array of elements, such that the relative ranking of vulnerability comprises a generation of a plurality of eigenvectors for the influence network, and each of the plurality of eigenvectors comprises a plurality of coordinates equal in number to the elements in the array of elements; and
an algorithm modifier configured to modify the reconfiguration algorithm to take into account the relative ranking of vulnerability to form a modified reconfiguration algorithm.

12. The apparatus of claim 11 further comprising:
the antenna system configured to compensate for undesired events and improve a performance of the antenna system.

13. The apparatus of claim 11, further comprising the array of elements comprising an array of antenna elements.

14. The apparatus of claim 11, further comprising the analyzer configured to generate the influence network from an influence matrix that comprises:
a plurality of rows equal in number to the elements in the array of elements; and
a plurality of columns equal in number to the elements in the array of elements, the analyzer further configure to identify, based on the influence of the undesired event that occurs at an $i^{th}$ element on a $j^{th}$ element a weight value for every (i,j) matrix element in the influence matrix.

15. The apparatus of claim 11, further comprising the ranking generator configured to:
select an eigenvector in the plurality of eigenvectors associated with a largest eigenvalue as a selected eigenvector; and
order the plurality of coordinates of the selected eigenvector to create the relative ranking of vulnerability for the elements in the array of elements.

16. The apparatus of claim 15, further comprising the algorithm modifier configured to adjust, based upon a cost function of the reconfiguration algorithm, the reconfiguration algorithm to form a final cost function that takes into account the relative ranking of vulnerability.

17. The apparatus of claim 16, further comprising the final cost function comprises:
an influence cost function configured to establish a first cost associated with an occurrence of an undesired event; and
a performance cost function configured to establish, with an operation, that meets a set of performance requirements of the antenna system, a second cost associated with the antenna system.

18. An antenna management system that comprises:
an antenna system that comprises an array of antenna elements that comprises a current state;
an analyzer configured to generate, based upon a reconfiguration algorithm, an influence network for the array of antenna elements, the influence network configured to indicate, given the current state of the array of antenna elements, an influence of an occurrence of an undesired event at any antenna element in the array of antenna elements on a remaining portion of the array of antenna elements;
a ranking generator configured to create, based on the influence network, a relative ranking of vulnerability for antenna elements in the array of antenna elements, such that the relative ranking of vulnerability comprises a generation of a plurality of eigenvectors for the influence network, and each of the plurality of eigenvectors comprises a plurality of coordinates equal in number to a number of the antenna elements in the array of antenna elements; and an algorithm modifier configured to modify the reconfiguration algorithm to take into account the relative ranking of vulnerability to form a modified reconfiguration algorithm configured to compensate for undesired events and improve a performance of the antenna system.

19. The antenna management system of claim 18, further comprising the ranking generator configured to:
   select an eigenvector in the plurality of eigenvectors associated with a largest eigenvalue as a selected eigenvector; and
   order the plurality of coordinates of the selected eigenvector to create the relative ranking of vulnerability for the antenna elements in the array of antenna elements.

20. The antenna management system of claim 19, further comprising the algorithm modifier configured to adjust, based upon a cost function of the reconfiguration algorithm, the reconfiguration algorithm to form a final cost function that takes into account the relative ranking of vulnerability.

* * * * *